(12) United States Patent
Lee et al.

(10) Patent No.: US 10,550,481 B2
(45) Date of Patent: Feb. 4, 2020

(54) MICRO-ENCAPSULATED, IMPROVED VAPOR CORROSION INHIBITOR

(71) Applicants: Clifford Lee, New Braunfels, TX (US); Cline H White, San Antonio, TX (US)

(72) Inventors: Clifford Lee, New Braunfels, TX (US); Cline H White, San Antonio, TX (US)

(*) Notice: Subject to any disclaimer, the term of this patent is extended or adjusted under 35 U.S.C. 154(b) by 79 days.

(21) Appl. No.: 15/320,687

(22) PCT Filed: Jun. 22, 2015

(86) PCT No.: PCT/US2015/036990
§ 371 (c)(1),
(2) Date: Oct. 26, 2017

(87) PCT Pub. No.: WO2015/196200
PCT Pub. Date: Dec. 23, 2015

(65) Prior Publication Data
US 2018/0073151 A1    Mar. 15, 2018

Related U.S. Application Data

(60) Provisional application No. 62/016,984, filed on Jun. 25, 2014, provisional application No. 62/015,127, filed on Jun. 20, 2014.

(51) Int. Cl.
*C23F 11/02* (2006.01)
*C09K 15/34* (2006.01)

(52) U.S. Cl.
CPC .............. *C23F 11/02* (2013.01); *C09K 15/34* (2013.01); *Y10T 428/249954* (2015.04)

(58) Field of Classification Search
CPC .................................. C09K 15/34; C23F 11/02
See application file for complete search history.

(56) References Cited

U.S. PATENT DOCUMENTS

| 2,668,748 A * | 2/1954 | Asbury | ................ | C10K 1/143 |
| | | | | 252/180 |
| 2006/0099247 A1* | 5/2006 | Cantwell | ............... | A61M 15/00 |
| | | | | 424/451 |

* cited by examiner

*Primary Examiner* — Peter F Godenschwager
(74) *Attorney, Agent, or Firm* — Jackson Walker LLP

(57) ABSTRACT

The current invention relates to a micro-encapsulated, volatile vapor corrosion inhibitor (VCI), and method for the use of same. More particularly, it relates to a fluid composition, and microencapsulation of the fluid composition, that inhibits corrosion and tarnishing and that may be relatively non-toxic. The VCI is intended to be employed in varying concentrations depending on the intended application and deployed via microcapsules. The microcapsules may be adapted to release the VCI over time, or all at once. To effect this, the microcapsules may be adapted to be breached at varying times or at the same time. By adapting the microcapsules, or the method of breaching the microcapsules, the rate at which the VCI is released may be controlled.

5 Claims, 4 Drawing Sheets

MICRO-ENCAPSULATED, IMPROVED VAPOR CORROSION INHIBITOR

BACKGROUND OF THE INVENTION

Field of the Invention

Figure 1:
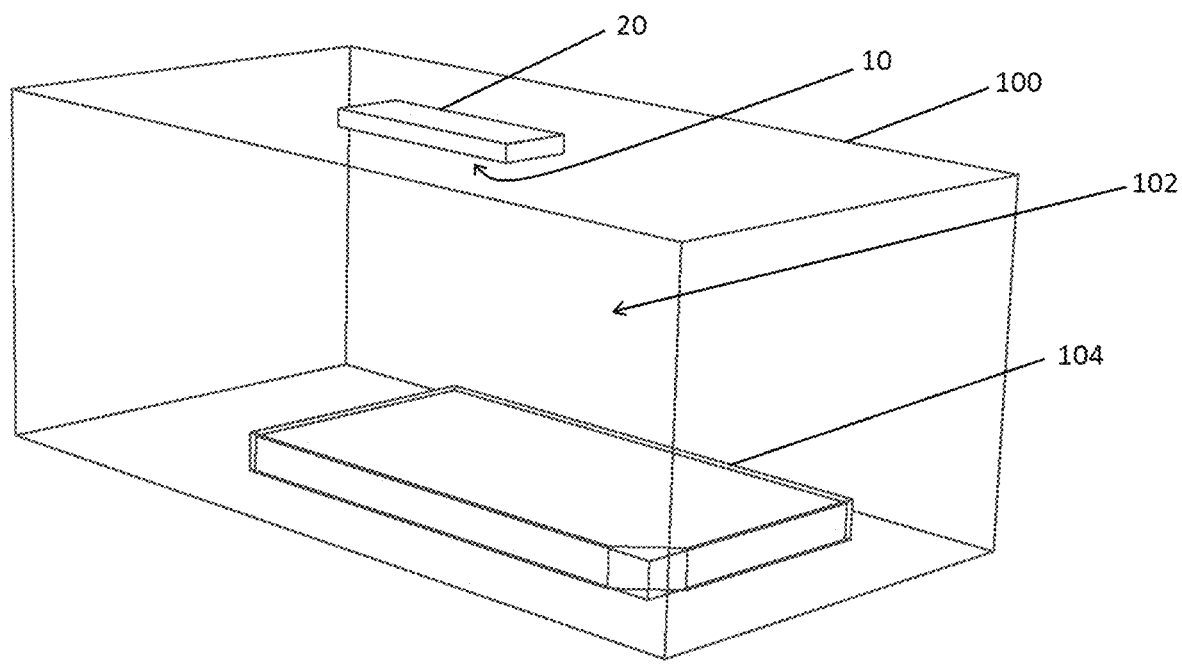
Figure 2A:
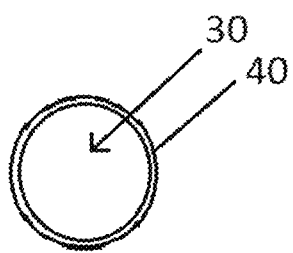
Figure 2B:
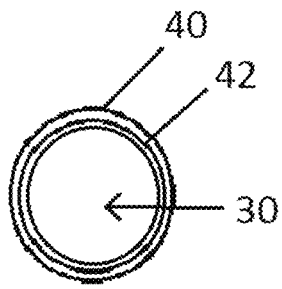
Figure 2C:
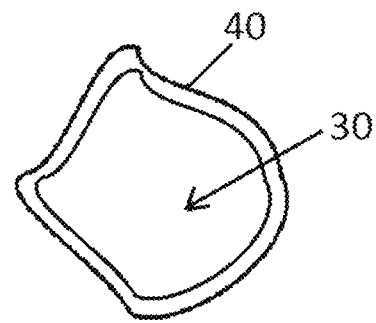

The current invention relates to a micro-encapsulted, volatile vapor corrosion inhibitor (VCI), and method for the use of same. More particularly, it relates to a fluid composition, and microencapsulation of the fluid composition, that inhibits corrosion and tarnishing and that may be relatively non-toxic.

Background Information

Corrosion affects metal (as used herein, "metal" refers to both pure metals and metal alloys) adversely and is a serious problem for both public and private sectors. Corrosion can affect the usefulness of an object and cause the object to need to be repaired or replaced. Either consequence affects the user's time and cost. Consequently, there have been numerous attempts to find ways to combat corrosion. Two of the main avenues have been permanent coatings and temporary corrosion inhibitors.

VCI are well known in the industry. They emit a vapor intended to fill an enclosed space and coat the metal surfaces of articles in the space to inhibit corrosion of the surfaces, and/or blend with moisture and oxygen in the space to neutralize the primary components (i.e., moisture and oxygen) that cause corrosion.

Conventional corrosion inhibitors are chemical compounds that decrease the corrosion rate of metal. Generally, the corrosion inhibitor creates a layer or forms a coating on the metal surface that acts to reduce oxidation of the metal by reducing the contact, or access, that the oxidizing agent has to the metal surface. It should be noted that the term "corrosion inhibitor" is not intended to apply to permanent coatings or layers that are applied to the metal, but rather the corrosion inhibitor is placed in the atmosphere near or adjacent to the metal such that the corrosion inhibitor can migrate to and coat or adsorb the metal surface with an atomic or polyatomic layer.

Common corrosion inhibitors designed to reduce oxidation-type corrosion are corrosion inhibiting chemicals including: sodium nitrite, chromates, silicates, borates, zinc compounds, phosphates of various types, azole compounds, and generally reductive inhibitors such as amines and hydrazines. Such corrosion inhibitors chemically can combine with oxygen to form other compounds so that the oxygen does not react with the metal, prevent the oxygen from interacting with the metal, or otherwise prevent or slow oxidative reactions. However, as chemical reactions continue to occur with oxygen, the corrosion inhibitor will eventually be depleted and the inhibition will be terminated. Or, in the case of oils that create a barrier, degrade and become ineffective over time. Thus, corrosion inhibitors tend to be temporary in nature. However, the corrosion inhibitor is continually released, can be reintroduced, into the metal's environment in order to maintain or reinstitute the anti-corrosive action.

If the corrosion inhibitor is volatile, then it is of a type that is vaporized (or vaporizes) at normal temperatures so that it can travel through a confined space to coat the metal surface. The VCI vaporizes and carries, chemically or ionically bonded to the volatile molecule, the anti-corrosive agent. Thus, as the volatile compound vaporizes, the electrically charged reactant is carried with the volatile compound. If the VCI is in a relatively enclosed airspace that includes the metal surface to be protected, then the VCI will come to an equilibrium in the airspace and the metal surface will be "coated" with the corrosion inhibitor.

SUMMARY OF THE INVENTION

The present invention is an improved VCI using non-toxic compounds that is designed to protect all commonly used metals from rust, tarnish, and corrosion. The improved VCI, upon vaporization, inhibits surface corrosion caused by normal atmospheric oxygenation and reduction on metal surfaces. The improved VCI has a volatile compound, or carrier, derived from a plant or plants within the Amaryllidaceae or Fabaceae plant families and a corrosion inhibitor that may be based upon derived from a plant or plants within the Amaryllidaceae or Fabaceae plant families as well.

The improved VCI is not a contact protectant nor a desiccant, rather it comes to an equilibrium in the limited atmosphere of the container and protects the interior of the container and its metallic contents against corrosion regardless of natural environmental conditions acting in the container.

The composition of the improved VCI of the present invention is environmentally friendly, safe, nontoxic, and effective at reducing corrosion. It is derived from completely natural, organic sources. It is bio-degradable and can be recycled. It is anticipated that the emitting substrate may be recycled paper. With an application to an emitting substrate, an enclosed environment can be rendered safe from corrosion to a variety of metallic objects, such as firearms, tackle, tools, jewelry, parts, instruments, and electronic circuits. The emitting substrate can be customized with text and color graphics in order to enhance the visual appeal without affecting the efficacy of the improved VCI.

The improved VCI impregnated emitting substrate is placed in a container with the items that are intended to be protected from corrosion. Upon closing the container with the items inside, the improved VCI volatizes or diffuses creating an atmosphere of bipolar ionic shielding atoms that adsorb onto all metal surfaces inside and out wherever air can reach, forming an invisible layer of protection on all metallic surfaces even in the smallest holes and intricacies that standard methods of rust prevention cannot reach. Once the chemistry is applied and the container closed no further attention is required until it is opened again. If the improved VCI is still at an adequate level on the emitting substrate, then after the container is reclosed, the levels of improved VCI will return to protective amounts in the enclosed atmosphere. Or, the improved VCI can be reapplied to the emitting substrate.

When introduced into a contained atmosphere, the improved VCI coats all metals in an enclosed space with a molecular layer that inhibits corrosion and oxidation, however, when the improved VCI is used with an emitting substrate there is no discernible residue placed upon components near the substrate due to the dispersal of the improved VCI. The improved VCI is not a desiccant designed to absorb water, so it is not necessary to place a relatively large bag of desiccant in the container, nor continually re-dry the desiccant.

The improved VCI is used to protect all metals and electronic parts from rust and corrosion during shipment, storage and use, and does not require special cleaning or treatment of the metal pieces to be protected before use.

Micro-encapsulation is a process in which a tiny particle or droplet of liquid is encased in a coating, or coatings, to create a microcapsule. The microcapsule can be used to store, transport, and deliver the liquid held in the core of the microcapsule. Because the core is isolated from the environment, degradation of the core material is slowed. Most microcapsules have diameters ranging from a few micrometers to a few millimeters. Often, the material used for the coating are chosen from ethyl cellulose, polyvinyl alcohol, gelatin, or sodium alginate. The common methods for manufacturing microcapsules include pan coating, air suspension coating, centrifugal extrusion, vibrational nozzle, spray drying, ionotropic gelation, coacervation-phase separation, interfacial polycondensation, interfacial cross-linking, in-situ polymerization, or matrix polymerization. However, in the present invention, the coating material and micro encapsulation process is anticipated to provide for adequate encapsulation of VCI's and the improved VCI.

Figure 3A:
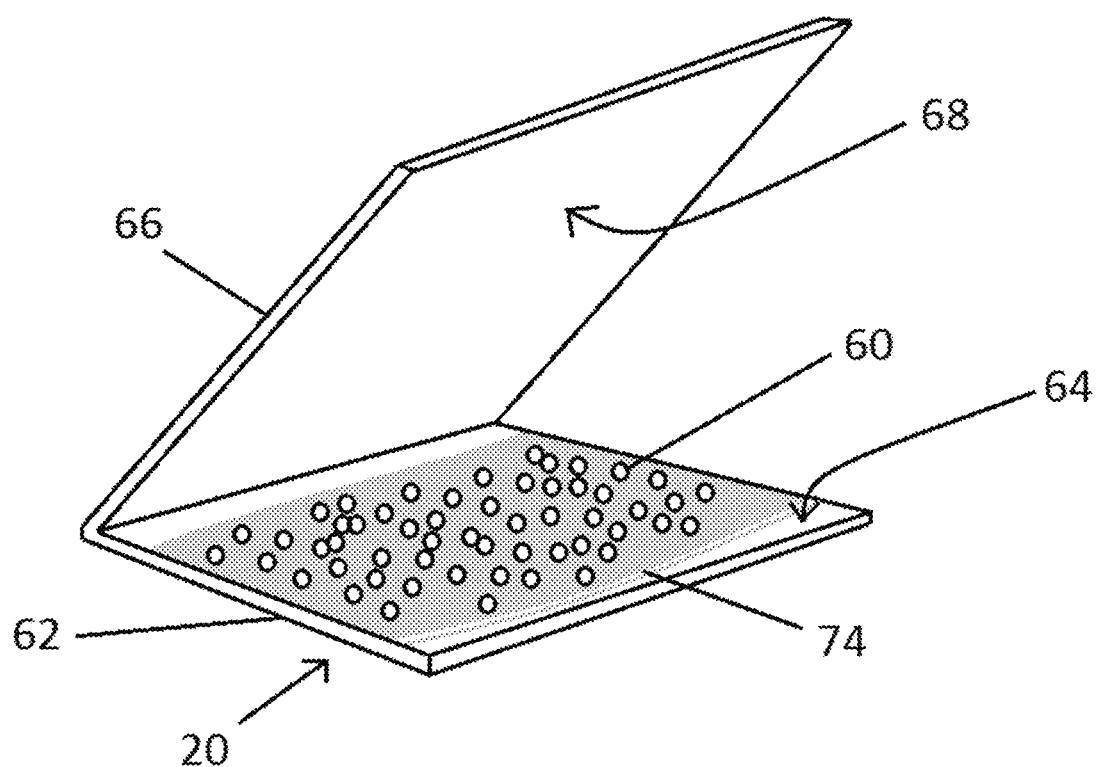
Figure 3B:
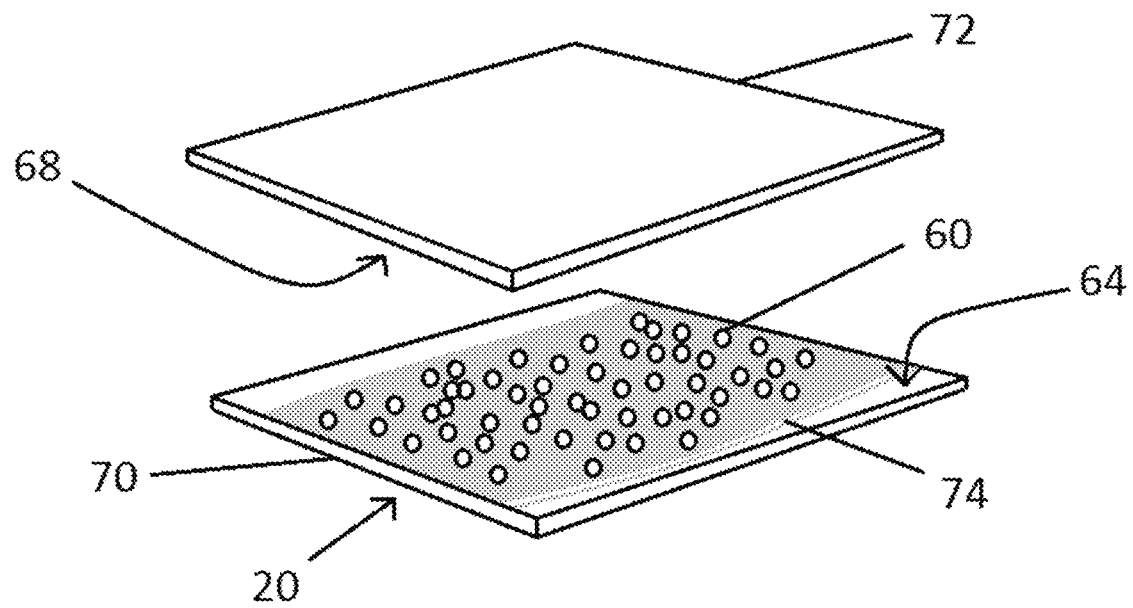

In order to deploy a VCI, or the improved VCI, via micro encapsulation, the wall of the microcapsule must be ruptured exposing the core contents (the VCI for the improved VCI) to the environment and allowing the VCI to vaporize. The wall of the microcapsule is generally breached using pressure or shear forces (although many other methods may be used to breach the wall of the microcapsule, such as solvent action, enzyme action, chemical reactions, hydrolysis, or slow disintegration).

The improved VCI is intended to be employed in varying concentrations depending on the intended application. In the present invention it is intended that either a VCI, or the improved VCI, will be deployed in microcapsules.

It is also anticipated that the microcapsules could be adapted to release the VCI over time, or all at once. To effect this, the microcapsules may be adapted to be breached at varying times. By adapting the microcapsules, or the method of breaching the microcapsules, the rate at which the VCI is released may be controlled.

BRIEF DESCRIPTION OF THE DRAWINGS

FIG. 1 is a perspective view of an enclosed environment illustrating the use of the present invention.

FIGS. 2*a*-2*c* are perspective views of various types of microcapsules.

FIGS. 3*a* and 3*b* are perspective views of one embodiment of a deployment method for the VCI filled microcapsules.

FIG. 4 is a side view of one embodiment of a deployment method for the VCI filled microcapsules.

DETAILED DESCRIPTION OF THE PREFERRED EMBODIMENT

Referring to the figures, FIG. 1 illustrates how the improved VCI 10 inhibits corrosion. The improved VCI 10 uses a volatile compound, or carrier, derived from a plant or plants within the Amaryllidaceae plant family to cause vaporization. Volatility is due generally to phenols in the compound. Natural phenols such as found in the Amaryllidaceae plant family, can chemically interact with many other substances in the form of stacking. "Stacking" refers to attractive, non-covalent interactions between aromatic rings. Thus, as the compound vaporizes, it can interact with, and take other molecules with anti-corrosive properties. These anti-corrosive properties are in the form of an ionic bond formed with oxygen molecules. As oxygen molecules are thus engaged, they are not available to cause oxidation, or corrosion of the metallic object. An emitting substrate 20, which is loaded with the improved VCI 10 is placed in a container 100. As used herein, "loaded" is intended to mean that some amount of the improved VCI 10 is contained on or in the emitting substrate 20 in the microcapsules. Anti-corrosive ions (not shown) of the improved VCI 10 are carried into the gaseous phase with the carrier as a vapor. This vapor will come to an equilibrium that fills the interior 102 of the container 100. It is anticipated that varying sizes of emitting substrates 20 and amounts of improved VCI 10 will be used in conjunction with varying volumes of container 100 interiors 102. The vapor is intended to fill the interior 102 and coat the metal surfaces of articles 104 in the interior 102 to inhibit corrosion and oxidation. The improved VCI 10 inhibits corrosion of the surfaces 104, and/or blend with moisture and oxygen in the interior 102 to neutralize the primary components (i.e., moisture and oxygen) that cause corrosion.

The emitting substrate 20 inside a container 100 that has a hollow interior space 102. An amount of VCI 10 in microcapsules are loaded on the emitting substrate 20. Over time, the improved VCI 10 vaporizes emitting improved VCI 10 ions (not shown) into the interior 102 of the container 100. These ions (not shown) come to an equilibrium filling (if there is sufficient amount of improved VCI 10 loaded on the emitting substrate 20) the interior 102. The ions (not shown) come in contact with a metallic object 104 in the interior 102. A layer of the ions (not shown) coats the metallic object 104 which inhibits corrosion of the metallic object 104.

Dissolved, or vaporized, ions (not shown) from the improved VCI 10 in the emitting substrate 20 enter into a gaseous phase. Some of these ions (not shown) bond with the object 104, and form an ionic layer on the object 104. This layer on the metallic object 104 of the improved VCI 10 acts as an anti-corrosive.

It is anticipated that the interior 102 may not be sealed from the outside environment. This may occur if the container 100 is temporarily opened, or if the container has apertures or is otherwise permeable to the outside environment. In these cases, objects 104 remaining in the container 100 after the container 100 is opened will be protected from corrosion if sufficient improved VCI 10 remains on the emitting substrate 20 such the corrosion inhibiting ion vapor again develops in the container 100 after it is closed. In the instance in which a container 100 has a more permanent aperture, then improved VCI 10 ions (not shown) will continually be dispersed into the atmosphere and lost to the outside environment. The improved VCI 10 will continue vaporizing from the emitting substrate 20, so ions (not shown) will continue to protect the object 104 from oxidation until to many ions (not shown) are lost to the outside environment.

FIGS. 2*a*-2*c* illustrate a few embodiments of microcapsules. Each has a circumferential wall. FIG. 2*a* illustrates a simple, single walled spherical microcapsule. It has a first wall 40 that surrounds the VCI filled core 30. FIG. 2*b* illustrates a multiwalled microcapsule. It has a first wall 40, and a second wall 42 that surround the VCI filled core 30. FIG. 2*c* illustrates an irregularly shaped microcapsule. As with the spherically shaped microcapsules, it has a first wall 40 that surrounds the VCI filled core 30. It is anticipated that the microcapsules would be manufactured so as to allow for deployment of the VCI for a given application and that the present invention is not limited by the shape, method of manufacture, number of walls, nor material of the walls of the microcapsules.

FIGS. 3a-3b illustrate a means for deploying the VCI filled microcapsules 60. In this first embodiment, used as an example herein, it is anticipated that the emitting substrate 20 will be constructed from either a single folded piece of paper (as shown in FIG. 3a), or two pieces of paper (as shown in FIG. 3b). Effectively, these are the same means. If a single folded piece of paper is used then the first fold 62 has a first surface 64 and the second fold 66 has a second surface 68. If two pieces of paper are used, then the first paper 70 has the first surface 64 and a second paper 72 has the second surface 68. In a first embodiment of use, microcapsules 60 containing either a standard VCI or the improved VCI are adhered to the first surface 64. The second surface 68 is attached to the first surface, sandwiching the VCI filled microcapsules, using an adhesive 74.

Figure 4:
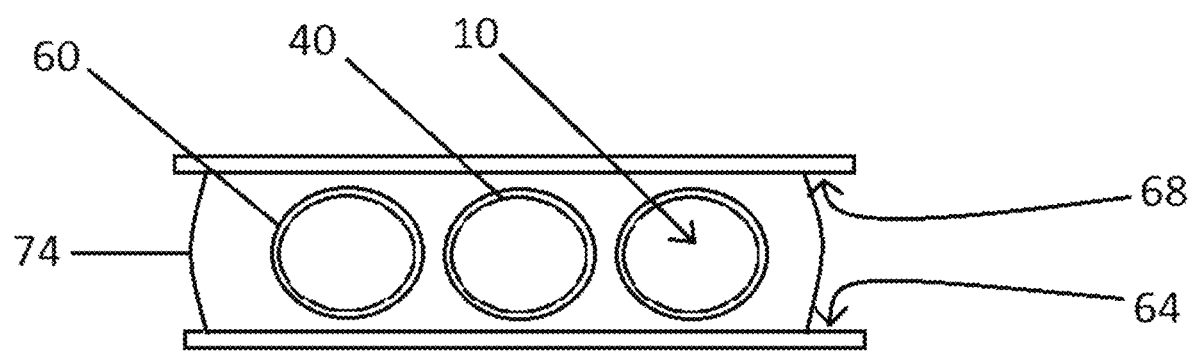

FIG. 4 illustrates when the second surface 68 is attached to the first surface 64 with an adhesive 74, the VCI filled microcapsules 60 are sandwiched between the surfaces and generally fixed in place. When the first 64 and second 68 surfaces are pulled apart, the tearing action breaches the microcapsule walls 40 exposing the VCI, or improved VCI 10, to the environment. As the VCI, or improved VCI 10, vaporize, ions (not shown) are released. Presumably, if the user has placed the emitting substrate 20 in an enclosed environment 102, then the VCL ions (not shown) attempt to reach an equilibrium in the container. The VCL ions (not shown) provide anti-corrosive protection, keeping even the smallest piece of metal 104 coated and corrosion free. There is no need to clean the object 104 prior to use. Emitting substrates 20 may be fibrous products, without limitation, such as paper, cloth sheets, wood pulp, fiberboard, or paperboard chips.

Likewise, the microcapsules 60 could be bonded to the first surface 64. In order to breach the microcapsule wall 40 and expose the VCI, or improved VCI 10, to the environment, then the user could employ a number of means including but not limited to: frictional force applied with a breaching member, pressure, shear forces, solvent action, enzyme action, chemical reactions, hydrolysis, or slow disintegration.

The emitting substrate 20 may take the form of a printed paper. The printing will not affect the emitting substrate 20 and improved VCI 10 as a whole. Therefore, it is anticipated that marketing materials, such as a business card or magazine insert, could be printed, distributed with microcapsules 60 filled with the improved VCI 10. For example, and advertiser could give the emitting substrate/marketing material 20 to a client/customer, or potential client/customer. Because the emitting substrate/marketing material 20 would be more useful than ordinary marketing materials, the client would be enticed to use the emitting substrate/marketing material 20 in protecting some personal metallic object 104 and thus be repeatedly reminded of the advertiser.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A volatile vapor corrosion inhibitor comprising:
   a solution containing a volatile compound derived from a plant or plants within the Fabaceae plant family, and a corrosion inhibitor; and
   a microcapsule having a circumferential wall containing said solution.

2. The volatile vapor corrosion inhibitor of claim 1, further comprising a means for breaching a wall of said microcapsule.

3. The volatile vapor corrosion inhibitor of claim 1, further comprising a first surface, and wherein said microcapsule is attached to said first surface.

4. The volatile vapor corrosion inhibitor of claim 1, further comprising a plurality of said microcapsules, and wherein said microcapsules are adapted to be breached at varying times.

5. The volatile vapor corrosion inhibitor of claim 1, further comprising:
   a first surface, wherein said microcapsule is attached to said first surface;
   a second surface, said second surface attached to said first surface with an adhesive such that said microcapsule is held between said first and said second surface; and
   wherein when said second surface is pulled away from said first surface, the wall of said microcapsule is breached and said solution is exposed to an environment.

* * * * *